United States Patent
Siraky

(10) Patent No.: US 12,235,176 B2
(45) Date of Patent: Feb. 25, 2025

(54) DEVICE FOR DETERMINING THE TORQUE AND/OR ROTATIONAL ANGLE BETWEEN A FIRST SHAFT AND A SECOND SHAFT

(71) Applicant: NEURA ROBOTICS GMBH, Metzingen (DE)

(72) Inventor: Josef Siraky, Donaueschingen (DE)

(73) Assignee: NEURA ROBOTICS GMBH, Metzingen (DE)

( * ) Notice: Subject to any disclaimer, the term of this patent is extended or adjusted under 35 U.S.C. 154(b) by 198 days.

(21) Appl. No.: 17/784,443

(22) PCT Filed: Nov. 27, 2020

(86) PCT No.: PCT/EP2020/083728
§ 371 (c)(1),
(2) Date: Jun. 10, 2022

(87) PCT Pub. No.: WO2021/115805
PCT Pub. Date: Jun. 17, 2021

(65) Prior Publication Data
US 2023/0003593 A1    Jan. 5, 2023

(30) Foreign Application Priority Data
Dec. 13, 2019   (DE) .......................... 102019134392.5

(51) Int. Cl.
*F16H 49/00* (2006.01)
*G01L 3/10* (2006.01)

(52) U.S. Cl.
CPC ............ *G01L 3/109* (2013.01); *F16H 49/001* (2013.01)

(58) Field of Classification Search
CPC ................................ G01L 3/109; F16H 49/001
See application file for complete search history.

(56) References Cited

U.S. PATENT DOCUMENTS 6,258,007 B1   7/2001   Kristjansson
6,356,847 B1   3/2002   Gerlitzki
(Continued)

FOREIGN PATENT DOCUMENTS

CN   102798493 A    11/2012
DE   19823903 A1    12/1999
(Continued)

OTHER PUBLICATIONS

Office Action issued Aug. 31, 2022, in corresponding application DE 10 2019 134392.5.

(Continued)

*Primary Examiner* — Jamel E Williams
(74) *Attorney, Agent, or Firm* — Nath, Goldberg & Meyer; Jerald L. Meyer; Stanley N. Protigal

(57) ABSTRACT

A device for determines the torque and/or the rotary angle between a first shaft and a second shaft, which are coupled via a gear mechanism to rotate relative to one another about an axis of rotation. The first shaft has a first end region, a second end region, and a first direction vector pointing in parallel with the axis of rotation from the first end region to the second end region, and the second shaft has a first end region, a second end region, and a second direction vector pointing in parallel with the axis of rotation from the first end region to the second end region. The first shaft is designed as a hollow shaft and the second shaft is arranged coaxially in the first shaft in such a way that the first direction vector and the second direction vector have the same orientation.

11 Claims, 2 Drawing Sheets

(56) References Cited

U.S. PATENT DOCUMENTS

Figure 1:
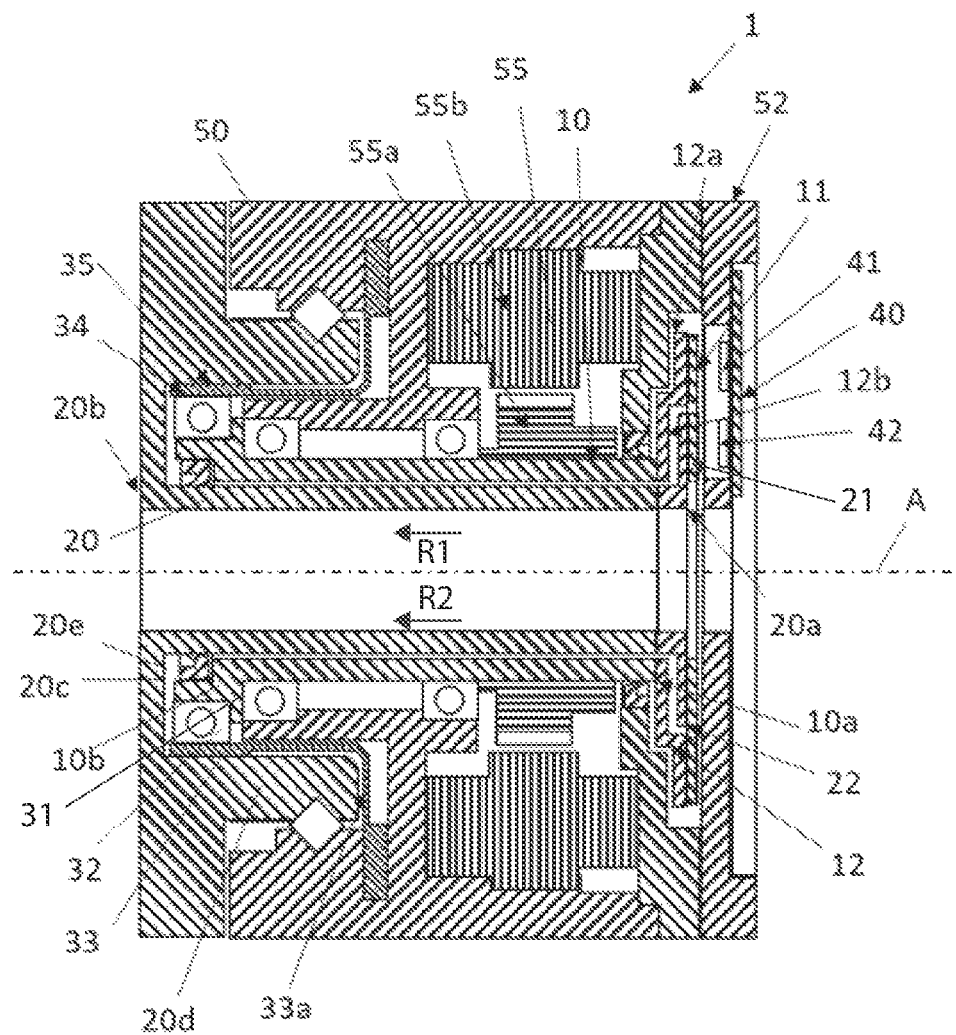

| | | | |
|---|---|---|---|
| 10,500,734 B1 | 12/2019 | Xiong et al. | |
| 2009/0140731 A1 | 6/2009 | Miyashita et al. | |
| 2010/0107814 A1 | 5/2010 | Tominaga et al. | |
| 2012/0217956 A1 | 8/2012 | Parakka | |
| 2012/0297894 A1* | 11/2012 | Strothmann | G01L 3/109 73/862.08 |
| 2013/0144553 A1 | 6/2013 | Omata et al. | |
| 2015/0369636 A1 | 12/2015 | Deak et al. | |
| 2017/0284828 A1 | 10/2017 | Rodger et al. | |
| 2018/0245947 A1 | 8/2018 | Ausserlechner | |
| 2021/0310834 A1 | 10/2021 | Coyne et al. | |

FOREIGN PATENT DOCUMENTS

| | | | | |
|---|---|---|---|---|
| DE | 102010037226 A1 | | 3/2012 | |
| DE | 102012100682 A1 | | 11/2012 | |
| DE | 102016004810 B3 | | 6/2017 | |
| EP | 2190104 A1 | | 8/2008 | |
| EP | 2386844 A1 | | 11/2011 | |
| JP | 2008136348 A | * | 6/2008 | ............ F01D 15/10 |
| JP | 2013154433 A | * | 8/2013 | |
| JP | 2013114567 A1 | | 5/2015 | |
| JP | 2019109139 A | * | 7/2019 | ......... C08G 18/6208 |
| JP | 2019170038 A | * | 10/2019 | |
| SK | 1382007 A3 | | 6/2009 | |
| WO | 1995/014555 | | 6/1995 | |
| WO | 0140750 A2 | | 6/2001 | |
| WO | 2009/034817 A | | 3/2009 | |
| WO | WO-2009034817 A1 | * | 3/2009 | ............ H02K 16/00 |
| WO | 2013/114567 A1 | | 8/2013 | |

OTHER PUBLICATIONS

Office Action issued Jan. 9, 2024, in parallel pending Japanese patent application No. 2022-534409 with English translation.
Office action issued by the Japanese Patent Office in respect of the parallel Japanese patent application No. 2022-534409 on Jul. 18, 2023. (translation attached).
Office action issued by the Chinese Patent Office on Sep. 29, 2023, in parallel pending Chinese patent application No. 202080086155.5.
Office Action issued Aug. 20, 2024, in parallel pending Taiwan patent application No. 109 143 808.
Zhang, Zijian et al., "A Method for Measurement of Absolute Angular Position and Application in a Novel Electromagnetic Encoder System", Hindawi Publishing Corporation, Journal of Sensors, vol. 2015, article ID 503852; Apr. 4, 2015.
Exhibition documentation "Somanet Circulo" DPMADirekt, SPS 2019; retrieved Mar. 15, 2024.
CSD1800 Encodermodul; retrieved Mar. 15, 2024.
German opposition notification mailed Mar. 27, 2024.
International Preliminary Report for corresponding PCT/EP2020/083728.
Office action in parallel pending Korean patent application No. 10 2022 7021337, issued by the Korean patent office on Jun. 4, 2024.

* cited by examiner

DEVICE FOR DETERMINING THE TORQUE AND/OR ROTATIONAL ANGLE BETWEEN A FIRST SHAFT AND A SECOND SHAFT

This is a National Phase Application filed under 35 U.S.C. 371 as a national stage of PCT/EP2020/083728, filed Nov. 27, 2020, an application claiming the benefit of German Application No. 10 2019 134 392.5 filed Dec. 13, 2019, the content of each of which is hereby incorporated by reference in its entirety.

The invention relates to a device for determining the torque and/or the rotary angle between a first shaft and a second shaft, which are coupled via a gear mechanism so that they can rotate relative to one another about an axis of rotation, according to the preamble of claim 1.

It is known to use a rotary angle measuring system to control a motor, for example a servomotor, on a moving axle such as the arm of a robot, which determines the information required for control, such as speed and rotary angle position. The motor usually has a drive shaft, which transmits the force applied by the motor to an output shaft via a gear mechanism. Gear mechanisms are known to be elastic and non-linear, which means that the speed of the motor does not behave linearly either after the transmission ratio has been increased or reduced by the gear mechanism. Therefore, the elasticity of the gear mechanism under load causes an rotary angle displacement between the expected rotary angle position of the output shaft and the actual rotary angle position of the output shaft. In known systems, in order to avoid such a rotary angle offset, a second rotary angle measuring system is arranged on the output shaft, which system directly detects the movement of the output shaft. Additional sensors such as strain gauges are used to determine the torque that acts between the two shafts. Overall, a large number of sensors is required, and therefore such systems are complicated and expensive.

The object of the invention is therefore to provide a device for determining the torque and/or the rotary angle between a first shaft and a second shaft which has a simpler structure and can be produced more cost-effectively.

The object is achieved according to the invention by a device for determining the torque and/or the rotary angle between a first shaft and a second shaft with the features of claim 1.

Advantageous embodiments and developments of the invention are specified in the dependent claims.

The device according to the invention for determining the torque and/or the rotary angle between a first shaft and a second shaft, which are coupled via a gear mechanism to rotate relative to one another about an axis of rotation, wherein the first shaft has a first end region, a second end region, and an end region parallel to the axis of rotation has a first direction vector pointing from the first end region to the second end region, and the second shaft has a first end region, a second end region, and a second direction vector pointing parallel to the axis of rotation from the first end region to the second end region, is characterized in that the first shaft is designed as a hollow shaft and the second shaft is arranged coaxially in the first shaft in such a way that the first direction vector and the second direction vector have the same orientation, and that the first end region of the first shaft has a first measurement standard and the first end region of the second shaft has a second measurement standard, wherein the first measurement standard is scanned by a first sensor and the second measurement standard by a second sensor.

The basic idea of the invention is to insert one shaft into the other shaft, which is designed as a hollow shaft, and to arrange the measurement standards at the same end of the two shafts in close proximity to one another, which can be scanned by two sensors that are also located in close proximity to each other. Instead of two spatially separate rotary angle measuring systems, two measurement standards arranged in close proximity to each other can be scanned, whereby the rotary angle position of each of the two shafts can be determined. At the same time, this arrangement also enables the torque to be determined in a simple manner, which results from a rotary angle offset between the expected rotary angle position of the second shaft, for example the output shaft, and the actual rotary angle position of the second shaft, for example the output shaft, for example at a predetermined torque of a motor connected to the first shaft or by fixing the first shaft and measuring the resulting rotary angle on the second shaft under load.

According to an advantageous embodiment of the invention, the two sensors are arranged on the face side in front of the first end region of the two shafts, which enables a compact structure.

The two sensors are particularly preferably arranged on a single printed circuit board, as a result of which the number of components required can be reduced.

In a particularly advantageous development of the invention, the sensors are designed as optical scanning elements and the measurement standards as reflective measurement standards. Such angle measuring systems are particularly robust and enable a high resolution of the rotary angle to be detected.

The two measurement standards are preferably designed to be circumferential in order to be able to detect the rotary angle in a simple manner.

Particularly preferably, the first measurement standard is arranged on a first element in the shape of a disk ring, which element is arranged on the first end region of the first shaft, and the second measurement standard is arranged on a second element in the shape of a disk ring, which element is arranged on the first end region of the second shaft. This allows for a compact structure.

The two measurement standards are advantageously arranged concentrically to one another, which can simplify the evaluation of the detected angles of rotation.

According to a particularly preferred embodiment of the invention, the two measurement standards are arranged in the same plane, which can further simplify the evaluation of the detected angles of rotation.

The first shaft is preferably a drive shaft of the gear mechanism and the second shaft is an output shaft of the gear mechanism. Since the first shaft, which is designed as a hollow shaft, forms the drive shaft of the gear mechanism, the drive can be arranged on the first shaft in a space-saving manner.

In particular, the first shaft can advantageously be non-rotatably connected to the rotor of an electric motor.

Preferably, the gear mechanism is a tension shaft gear mechanism, which makes high transmission increase or reduction ratios possible in a small space.

The device according to the invention as described above is particularly preferably used in a robot, since it is particularly necessary in the case of robots to control their movement precisely. A robot according to the invention therefore comprises a device according to the invention.

Figure 2:
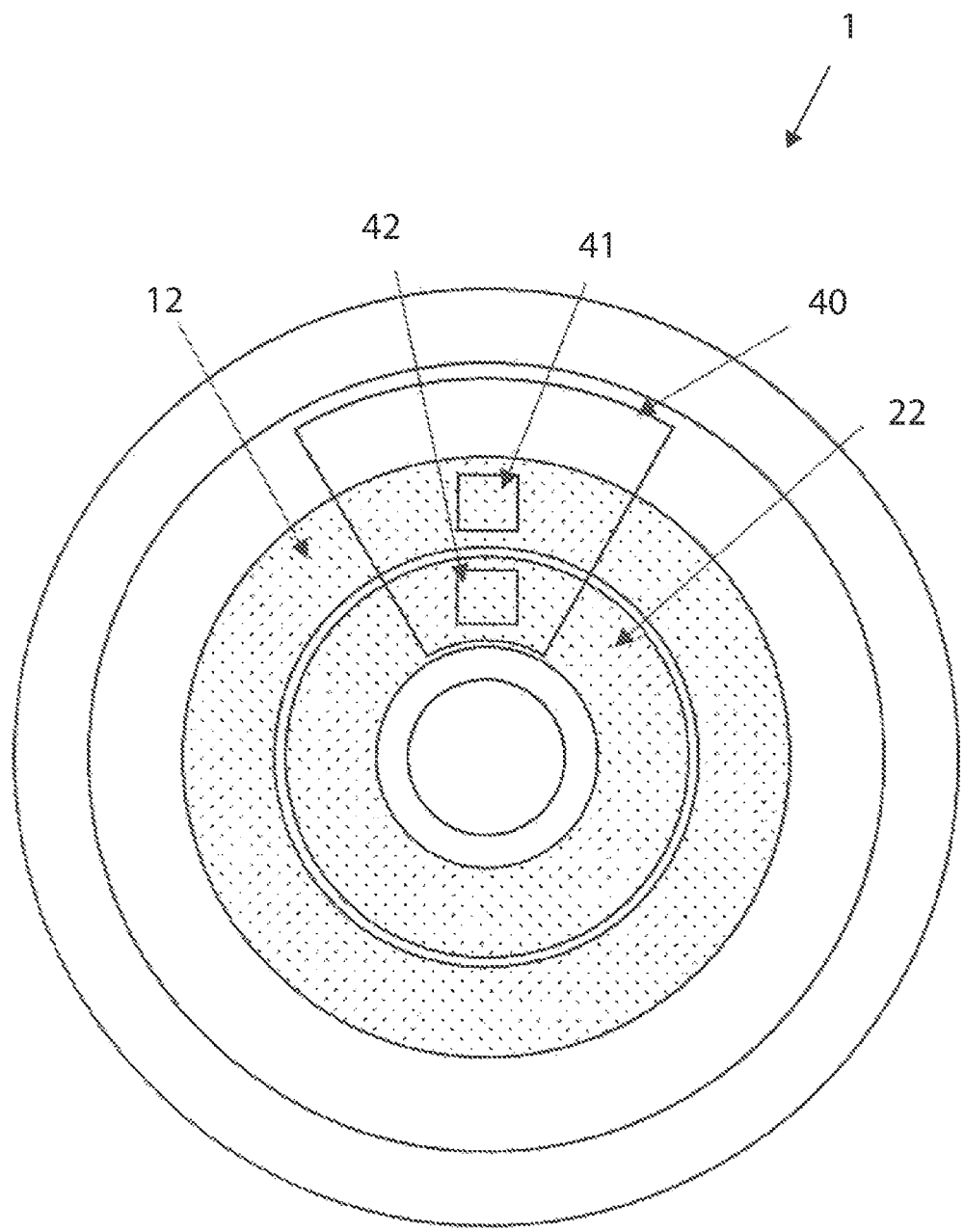

An embodiment of the invention is explained in detail with reference to the following figures, in which:

FIG. 1 shows a longitudinal section through an embodiment of a device according to the invention for determining the torque and/or the rotary angle between a first shaft and a second shaft and FIG. 2 shows a partially transparent plan view of the device according to FIG. 1.

FIGS. 1 and 2 show two views of a device 1 for determining the torque and/or the rotary angle between a first shaft 10 and a second shaft 20, which are rotatably coupled via a gear mechanism 30 relative to each other about an axis of rotation A. The first shaft 10 has a first end region 10a, a second end region 10b, and a first direction vector R1, which runs in parallel with the axis of rotation A and points from the first end region 10a to the second end region 10b. The second shaft 20 has a first end region 20a, a second end region 20b, and a second direction vector R2, which runs in parallel with the axis of rotation A and points from the first end region 20a to the second end region 20b. The first shaft 10 is designed as a hollow shaft in which the second shaft 20 is arranged coaxially. The arrangement is such that the first direction vector R1 and the second direction vector R2 have the same orientation, or in other words that the first end region 10a of the first shaft and the first end region 20a of the second shaft point to the same side. The first end region 20a of the second shaft 20 can lie within the first end region 10a of the first shaft 10, in particular end so as to be flush with it, or protrude slightly beyond it.

The first end region 10a of the first shaft 10 has a first measurement standard 11, while the first end region 20a of the second shaft 20 has a second measurement standard 21. The measurement standards 11, 21 can be formed circumferentially. For this purpose, the measurement standards 11, 21 can be arranged, for example, on the outer surface of the shafts 10, 20. In the exemplary embodiment shown, a first element 12 in the shape of a disk ring is arranged on the first end region 10a of the first shaft 10, at or on which the first measurement standard 11 is arranged, in particular circumferentially, while a second element 22 in the shape of a disk ring is arranged on the first end region 20a of the second shaft 20, at or on which the second measurement standard 21 is arranged, in particular circumferentially. The measurement standards 11, 21 are in particular arranged concentrically to one another. The disk ring-shaped elements 12, 22 each have a plane which is arranged in particular perpendicularly to the axis of rotation A, with the two disk ring-shaped elements 12, 22 and/or the two measurement standards 11, 21 in particular being arranged in the same plane. For this purpose, the first element 21 in the shape of a disk ring can be of a stepped design so that an outer region 12a of the first element 12 in the shape of a disk ring is arranged radially outside the second element 22 in the shape of a disk ring and in the same plane with it, while an inner region 12b of the first element 12 in the shape of a disk ring is arranged axially behind the disk-shaped second element 22.

The measurement standards 11, 21 permit at least one relative angle determination over one revolution. The measurement standards 11, 21 are preferably absolute measuring standards, which enable an angle to be determined over a large number of revolutions.

The first measurement standard 11 is scanned by a first sensor 41, while the second measurement standard 21 is scanned by a second sensor 42. The scanning can in particular take place optically. For this purpose, the measurement standards 11, 21 are designed to be reflective, while the sensors 41, 42 are designed as optical scanning elements.

The sensors 41, 42 are arranged, for example, on the face side in front of the first end regions 10a, 20a of the two shafts 10, 20 so that the measurement standards 11, 21 are scanned substantially in parallel with the axis of rotation A. Alternatively, scanning can also take place in the radial direction to the shafts 10, 20.

The sensors 41, 42 are particularly preferably arranged on a single printed circuit board 40. The scanning signals detected by the sensors 41, 42 are forwarded to an evaluation unit to determine the rotary angle positions of the first and second shaft 10, 20 and, if necessary, also to determine the torque acting between the shafts 10, 20 as described below. The angular positions can be determined independently of one another, i.e. the angular position of the first shaft 10 by scanning the first measurement standard 11 using the first sensor 41 and the angular position of the second shaft 20 by scanning the second measuring standard 21 using the second sensor 42. If the elasticity of the gear mechanism 30 is known, i.e. if it is known which angular difference is present between the two shafts 10, 20 without load during operation at a predetermined speed of the motor 50, the torque can be determined on the basis of the angular difference with load during operation between the two shafts 10, 20.

The device 1 can have a housing 50 which is closed by a cover 52, for example. In this case, the printed circuit board 40 can be arranged in the cover 52, as a result of which the sensor system is easily accessible.

The first shaft 10 may be the drive shaft of the gear mechanism 30, while the second shaft 20 may be the output shaft of the transmission 30. The first shaft 10 is in particular the motor shaft of a motor 50 which is preferably designed as an electric motor, in particular as a servomotor. The motor 50 has a rotor 55a and a stator 55b, the rotor 55a being coupled to the first shaft 10 in a torque-proof manner.

The gear mechanism 30 couples the second end region 20a of the first shaft 10 to the second end region 20b of the second shaft 20. The gear mechanism can be designed, for example, as a tension shaft gear mechanism. For this purpose, a radial projection 31, which has an elliptical cross section perpendicular to the axis of rotation A, can be arranged on the second end region 10b of the first shaft 10, on the outer circumference of which a ball bearing 32, which is designed as a roller bearing, for example, is arranged. A flexible, thin-walled sleeve 33 is arranged on the outer circumference of the ball bearing 32 and is arranged in a fixed manner in the housing 50 via a circumferential collar 33a. The outside of the sleeve 33 has external teeth 34. A radial projection 20c is arranged on the second end region 20b of the second shaft, which as a circumferential projection 20d on its surface facing in the direction of the first end region 20a so that a circumferential groove 20e is formed, which is open in the direction of the first end region 20a. Internal teeth 35 are arranged in the groove 20e, in which the external teeth 34 of the sleeve 33 engage. There is a difference in the number of teeth between the external teeth 34 and the internal teeth 35, for example by one or two teeth. When the first shaft 10 rotates about the axis of rotation A, the elliptical projection 31 deforms the sleeve 33, and, due to the tooth difference, a rotation of the second shaft 20 relative to the first shaft 10 is achieved. With a large number of teeth, a high transmission ratio increase or reduction can be achieved.

The device 1 is used in particular in a robot, for example in a moving joint of a robot.

The device 1 enables the angular positions of the first shaft 10 and the second shaft 20 to be determined in a simple manner, since the angular positions of the shafts 10, 20, in particular the angular position of the motor 50 and the angular position of the output shaft 20 and thus the output of the gear mechanism 30, can be determined independently using the sensors 41, 42, in each case. The device 1 enables, for example, the torque acting between the two shafts 10, 20 to be determined in the manner described below, but also in particular without additional mechanical components. If the first shaft 10 is fixed in its position and a torque to be determined acts on the second shaft 20, an angular difference occurs between the second shaft 20 and the first shaft 10, since the gear mechanism 30 has elasticity and acts like a torsion bar when the torque is applied. If the elasticity of the gear mechanism is known, the torque can be determined from the size of the angle difference. The known elasticity of the gear mechanism can be determined, for example, by determining the angular difference between the first shaft 10, i.e. the motor shaft or the drive shaft, and the second shaft 20, i.e. the output shaft, over the entire travel range without an additionally acting torque.

LIST OF REFERENCE SIGNS

1 Device
10 First shaft
10a First end region
10b Second end region
11 First measurement standard
12 Disk ring-shaped first element
12a Outer region
12b Inner region
20 Second shaft
20a First end region
20b Second end region
20c Radial projection
20d Circumferential projection
20e Groove
21 Second measurement standard
22 Disk ring-shaped second element
30 Gear mechanism
31 Projection
32 Ball bearing
33 Sleeve
33a Collar
34 External teeth
35 Internal teeth
40 Printed circuit board
41 Sensor
42 Sensor
50 Housing
52 Cover
55 Motor
55a Rotor
55b Stator
A Axis of rotation
R1 First direction vector
R2 Second direction vector

The invention claimed is:

1. A device (1) for determining the torque and/or the rotary angle between a first shaft (10) and a second shaft (20), which are coupled via a gear mechanism (30) to rotate relative to one another about an axis of rotation (A), wherein the first shaft (10) has a first end region (10a), a second end region (10b), and a first direction vector (R1) pointing parallel to the axis of rotation (A) from the first end region (10a) to the second end region (10b), and wherein the second shaft (20) has a first end region (20a), a second end region (20b), and a second direction vector (R2) pointing parallel to the axis of rotation (A) from the first end region (20a) to the second end region (20b), characterized in that:

the first shaft (10) is designed as a hollow shaft and the second shaft (20) is arranged coaxially in the first shaft (10) in such a way that the first direction vector (R1) and the second direction vector (R2) have the same orientation;

the first end region (10a) of the first shaft (10) has a first measurement standard (11) and the first end region (20a) of the second shaft (20) has a second measurement standard (21), the first measurement standard (11) being scanned by a first sensor (41) and the second measurement standard (21) by a second sensor (42), wherein the first and second sensors (41, 42) are arranged frontally in front of the first end regions (10a, 20a) of the two shafts (10, 20).

2. The device according to claim 1, characterized in that the two sensors (41, 42) are arranged on a single printed circuit board (40).

3. The device according to claim 1, characterized in that the sensors (41, 42) are designed as optical scanning elements and the measurement standards (11, 21) as reflective measurement standards (11, 21).

4. The device according to claim 1, characterized in that the two measurement standards (11, 21) are designed to run circumferentially.

5. The device according to claim 1, characterized in that the first measurement standard (11) is arranged on a disk ring-shaped first element (12) which is arranged on the first end region (10a) of the first shaft (10), and the second measurement standard (21) is arranged on a disk ring-shaped second element (22) which is arranged on the first end region (20a) of the second shaft (20).

6. The device according to claim 1, characterized in that the two measurement standards (11, 21) are arranged concentrically to one another.

7. The device according to claim 1, characterized in that the two measurement standards (11, 21) are arranged in the same plane.

8. The device according to claim 1, characterized in that the first shaft (10) is a drive shaft of the gear mechanism (30) and the second shaft (20) is an output shaft of the gear mechanism (30).

9. The device according to claim 1, characterized in that the first shaft (10) is non-rotatably connected to a rotor (55a) of an electric motor (55).

10. The device according to claim 1, characterized in that the gear mechanism (30) is a tension shaft gear mechanism.

11. A robot with a device (1) according to claim 1.

* * * * *